Oct. 25, 1966   B. S. WEICHT   3,281,047
CONTOUR WELDING TRACER
Filed Nov. 12, 1963   8 Sheets-Sheet 1

INVENTOR.
BRUNO S. WEICHT
BY
Whittemore, Hulbert & Belknap
ATTORNEYS

INVENTOR.
BRUNO S. WEICHT

Oct. 25, 1966

B. S. WEICHT 3,281,047

CONTOUR WELDING TRACER

Filed Nov. 12, 1963

INVENTOR.
BRUNO S. WEICHT
BY
ATTORNEYS

Oct. 25, 1966 B. S. WEICHT 3,281,047
CONTOUR WELDING TRACER
Filed Nov. 12, 1963 8 Sheets-Sheet 8

INVENTOR.
BRUNO S. WEICHT
BY
Whitmore, Hulbert & Belknap
ATTORNEYS

United States Patent Office 3,281,047
Patented Oct. 25, 1966

3,281,047
CONTOUR WELDING TRACER
Bruno S. Weicht, Madison Heights, Mich., assignor to Dollar Electric Company, Madison Heights, Mich., a corporation of Michigan
Filed Nov. 12, 1963, Ser. No. 322,752
23 Claims. (Cl. 228—7)

This invention relates generally to contour welding tracers, and refers more particularly to a contour welding tracer of the automatic compensating type.

The primary purpose of a device of this kind is to guide a welding torch along an irregular, contoured weld joint. In general, the torch is attached to a carriage which follows the exact contour of a design pattern. However, due to spring back of the metal and other production difficulties, it is not always possible to produce parts which conform consistently to the design pattern. A torch which can only follow a fixed design pattern obviously cannot follow the welding line of an incorrectly formed part, that is a part in which the welding line departs from the design contour. However, by the introduction of an automatic tracer, it is possible to adjust the torch position to correct for the error in the actual welding line of the part.

It is therefore an essential object of this invention to provide a contour welding tracer having means for automatically correcting the position of the torch to compensate for both vertical and horizontal error in the welding line of the part.

Another object is to provide a contour welding tracer having an improved probe head for tracing the actual welding line of the part.

Another object is to provide a contour welding tracer having an improved memory unit to which the plus or minus information is transmitted by the probe head and stored briefly before it is applied to the welding torch.

Another object is to provide a memory unit having a first memory drum for storing the vertical deviation of the actual welding line from the design contour, and a second memory drum, which serves as a driving pulley for the unit for storing horizontal deviation.

Another object is to provide a novel means for transferring plus or minus information from the probe to one of the memory drums.

Another object is to provide a memory unit having one or more drums provided with a large number of pins which are automatically adjusted to positions determined by the plus or minus error of the actual welding line, and having an improved and novel means for locking the pins in adjusted position.

Other objects and features of the invention will become apparent as the description proceeds, especially when taken in conjunction with the accompanying drawings, wherein:

FIGURE 5 is a view partly in section, taken on the line 5—5 of FIGURE 1.

Briefly, the contour welding tracer illustrated in the drawings has a probe attached to the bottom end of vertical shaft which is retained in a sleeve assembly. Both the shaft and the sleeve assembly can slide up and down within the range of the weld pattern. A cam roller, attached to the sleeve assembly, follows the established design contour imposed on the cam track, whereas the probe contact follows the actual weld seam contour of the production part. If the seam contour of the part does not conform to the design contour of the cam track, the probe will accordingly slide up or down inside the track-controlled sleeve assembly. This plus or minus information must be transferred over to the torch unit. However, since the probe moves ahead of the torch, this plus or minus information is transmitted to a memory unit and stored briefly before it is applied to the torch unit to correct the vertical position of the torch. Variations in the horizontal design contour are detected by the use of a cross-slide built inside the probe, which carries the probe contact. Hence a common probe contact senses both vertical and horizontal error. The plus or minus horizontal error is also transmitted to the memory unit and stored before it is applied to the torch unit.

Figure 1:
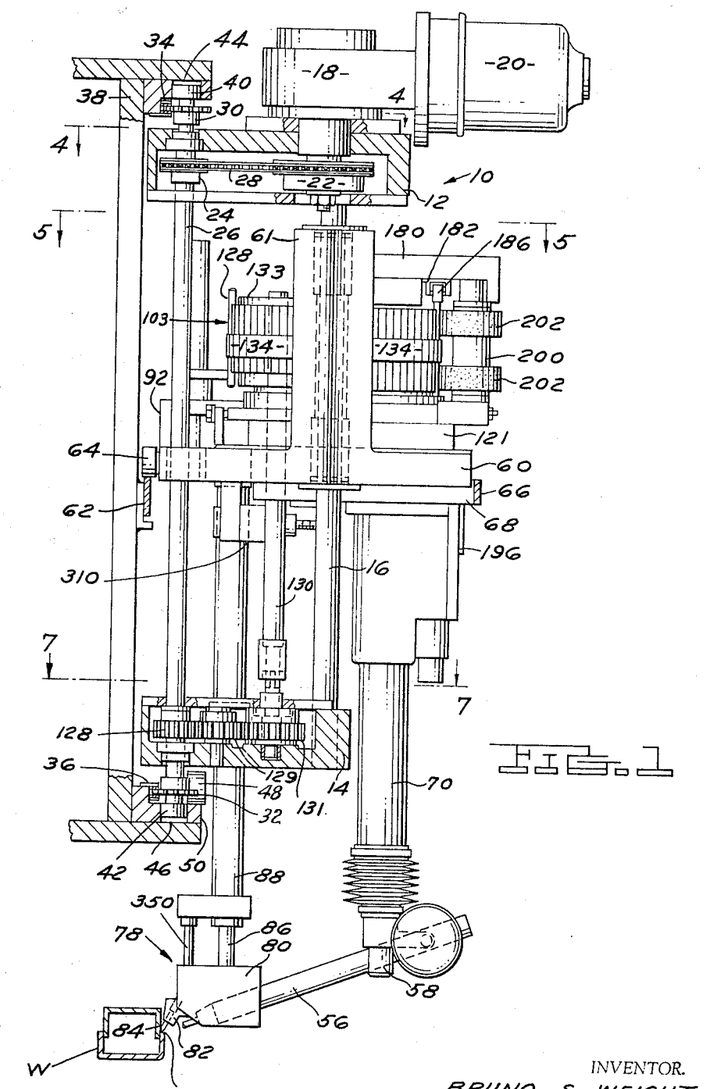
FIGURE 1 is an elevational view, with parts in section, of a contour welding tracer embodying my invention.
Figure 4:
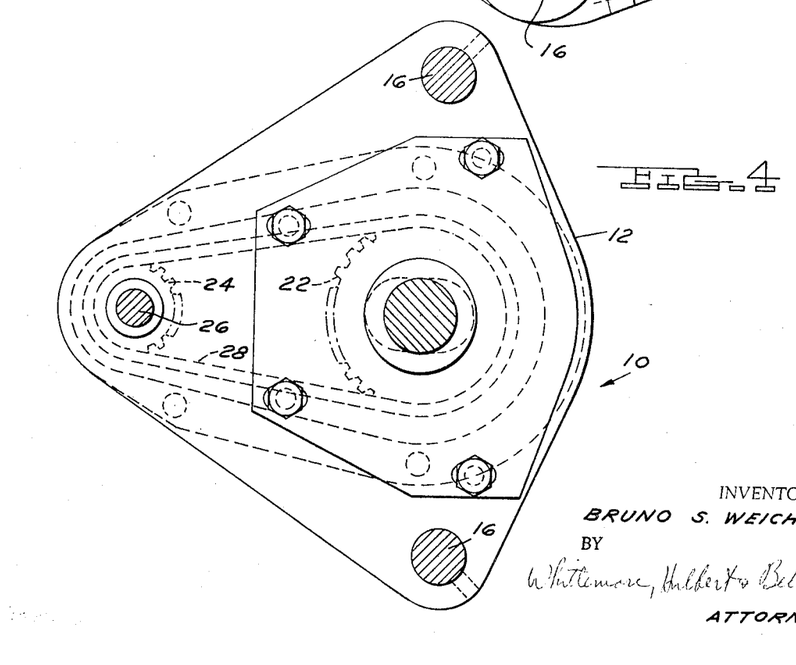
FIGURE 4 is a view partly in section, taken on the line 4—4 of FIGURE 1.
Figures 7, 13, 14:
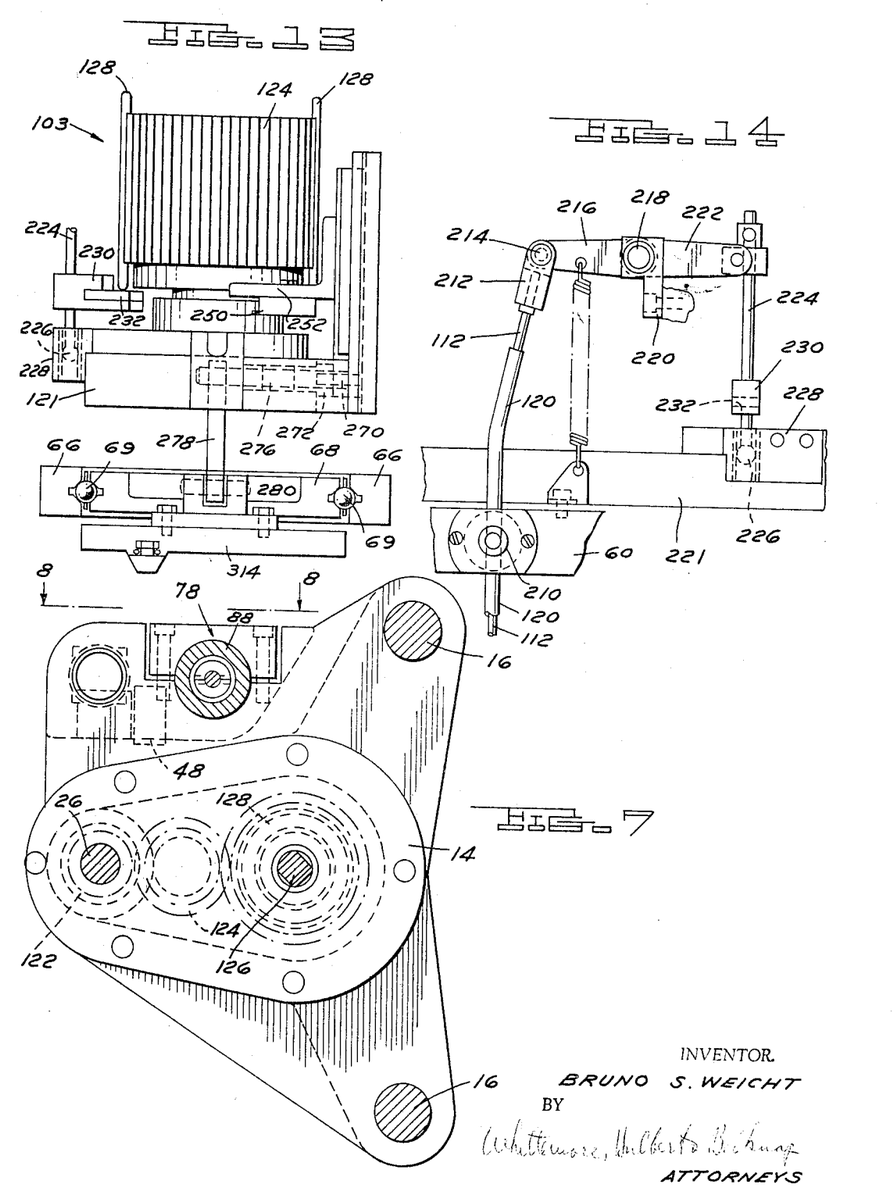
FIGURE 7 is a view partly in section, taken on the line 7—7 of FIGURE 1.
FIGURE 13 is a view taken on the line 13—13 of FIGURE 11.
FIGURE 14 is a view taken on the line 14—14 of FIGURE 11.
Figure 8:
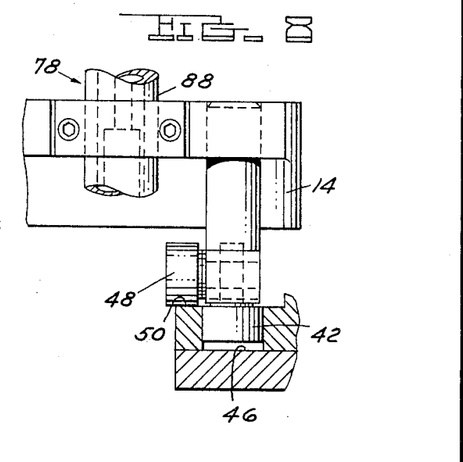
FIGURE 8 is a view partly in section, taken on the line 8—8 of FIGURE 7.

Referring now more particularly to the drawings and especially FIGURES 1, 4 and 7, the contour welding tracer comprises a carriage 10 which is designed to support the probe and the welding torch, and to travel along the length of the production part or workpiece. The carriage 10 includes an upper casting 12 and a lower casting 14 which are rigidly secured together by two tie rods 16. A gear reducer 18 mounted on the upper casting 12 is driven by a motor 20, and the output shaft of the gear reducer carries a sprocket 22. The sprocket 22 and a sprocket 24 are housed within the upper casting 12. Sprocket 24 is mounted on a vertically extending square drive shaft 26 which is journaled for rotation in both the upper and lower castings 12 and 14. A chain 28 extends around sprockets 22 and 24 to drive the shaft 26. Two driving sprockets 30 and 32 are mounted on shaft 26 and engage chains 34 and 36 which are rigidly secured to the fixed frame structure 38. Rollers 40 and 42 on the extreme ends of shaft 26 engage in elongated cam tracks 44 and 46 on the fixed frame structure. The cam tracks 44 and 46 are alike and are shaped to guide the carriage horizontally or laterally in conformity with the lateral irregularities in the design weld contour. The fixed chains 34 and 36 also conform to the path established by cam tracks 44 and 46 so that the driving sprockets 32 and 34 always engage the fixed chains. Supporting the weight of the carriage 10 on the fixed frame structure 38 is a roller 48 journaled on the lower casting 14 of the carriage. The roller rides on a fixed track 50 of the frame structure 38. The track 50 need not be contoured vertically, since the carriage is not required to follow the vertical irregularities in the design weld contour.

The welding torch is generally designated 56 and is mounted on the lower end of a vertical shaft 58. A support generally designated 60 is provided for both the welding torch and the memory unit. The support 60 is in the form of a large plate or shoe and has the vertical integral tubular portions 61 which slidably receive the two vertical carriage rods 16. Accordingly, the support 60 can slide up and down freely on these rods. A cam track 62 is secured to the fixed frame structure 38, and a roller cam follower 64 mounted on the support 60 rides along the contoured upper surface of the cam track. The cam track 62 is so contoured that it conforms to the vertical irregularities of the design pattern of the welding line. Hence the roller 64 riding on the cam track will cause the support 60 to move up and down in conformity with the design pattern as the entire tracer moves along.

Figure 2:
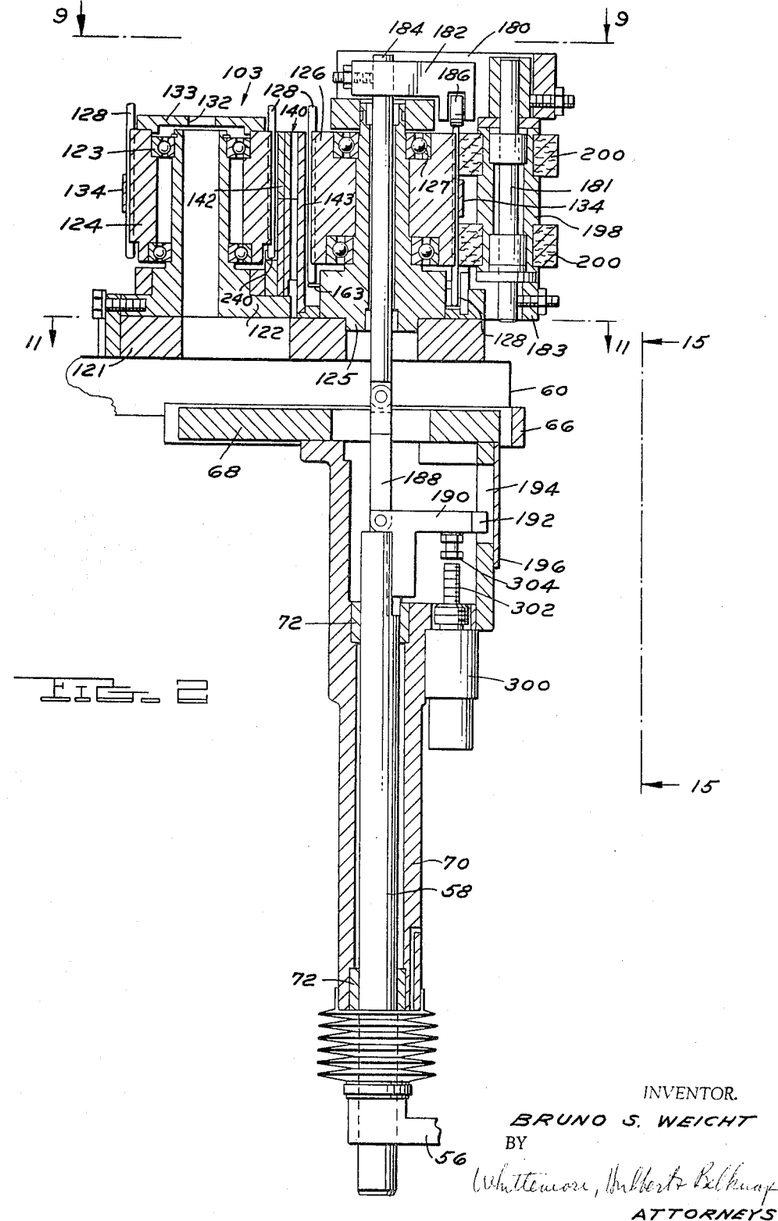
FIGURE 2 is a vertical sectional view showing portions of the memory unit and welding unit, which form parts of the tracer shown in FIGURE 1.
Figure 12:
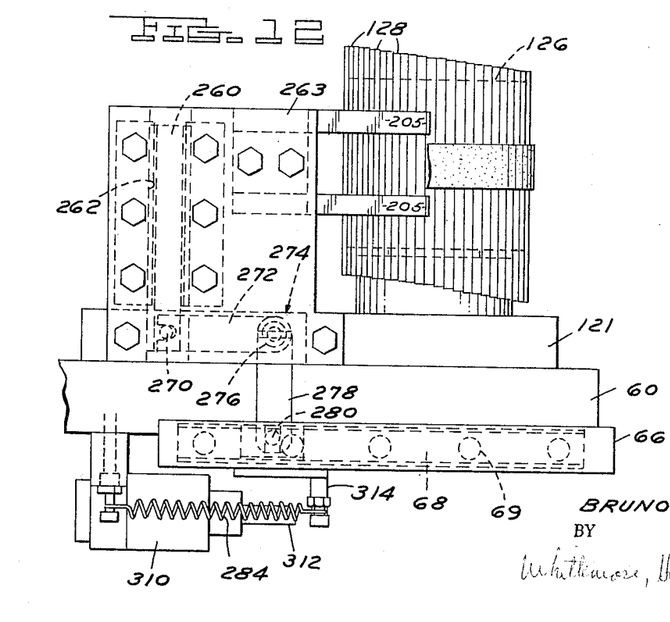
FIGURE 12 is a view taken on the line 12—12 of FIGURE 11.
Figure 15:
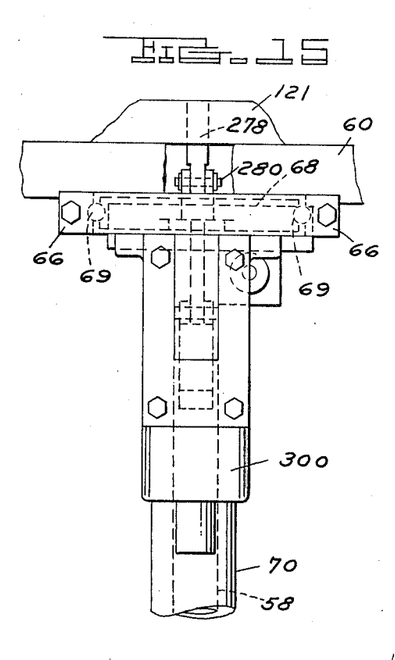
FIGURE 15 is a view taken on the line 15—15 of FIGURE 2.

Referring to FIGURES 2, 12 and 15, a pair of laterally spaced, parallel guide rails 66 are fixed to the support 60. The guide rails provide a sliding support for the torch slide 68, so that the torch slide can move horizontally in a direction transverse to the general direction of carriage movement. Ball bearings 69 are provided to allow the torch slide to move in and out freely. An elongated vertical tube or sleeve 70 is secured to the underside of the torch slide 68, and the shaft 58 extends within the sleeve 70 and is supported therein for free sliding movement by the bearings 72.

Vertical movement of the shaft 58 within the sleeve 70 compensates for vertical error in the contour of the actual welding line of the production part, and horizontal movement of the torch slide 68 compensates for horizontal error. When proper compensation is made, as explained more fully hereinafter, the tip of the welding torch will follow the seam S in the part or workpiece W as the tracer moves along the length of the workpiece.

As stated above, a probe unit 78 (FIGS. 1, 3 and 16–20) is provided to sense the deviation of the actual welding line from the design pattern. The probe unit 78 has a probe head 80 provided with a horizontal passage. An elongated probe slide 82 is supported for horizontal sliding movement in the passage and has a contact 84 on its outer end which is adapted to engage the weld seam. The probe head 80 can move vertically and the probe slide 82 can slide horizontally so that the contact 84 can follow the exact contour of the actual weld seam.

The probe head 80 is fixed to the lower end of a vertical rod 86. The rod 86 is supported within a vertical sleeve 88 so that it can slide vertically. Near the upper end of the sleeve 88, there is a generally L-shaped bracket 92 which carries a roller 94. This roller engages the same cam track 62 as is engaged by the roller 64 on the torch-carrying shoe 60. This bracket 92 has a block 96 permanently secured to it as by welding, and the block and bracket have aligned openings through which the sleeve 88 extends. A set screw 98 in the block 96 is screwed in tight against the side of sleeve 88 to lock the bracket 92 and sleeve 88 against relative axial sliding movement. The probe unit moves along with the carriage 10, since the sleeve 88 passes through and is slidably received in vertical passages in the torch-carrying shoe 60 and also in the lower casting 14 of the carriage (FIGURES 5 and 7). However, while the probe unit moves along with the rest of the structure, it is free to slide vertically relative thereto.

A cylindrical swivel head 99 normally engages the upper end of sleeve 88 so that it moves up and down with the sleeve. However, it is not connected to the sleeve. There are times when the swivel head 99 will be lifted off sleeve 88, and for this purpose an air cylinder 100 is carried by an integral flange extending out from the swivel head. This will be described more fully hereinafter.

The swivel head 99 is secured to an inner sleeve 101 which can slide up and down within the sleeve 88. The swivel head 99 is connected to a linkage generally designated 102 which transfers information to the memory unit 103. The rod 86 to which the probe head 80 is connected, is attached inside sleeve 88 to a second rod 105 of smaller diameter, and rod 105 extends freely through the inner sleeve 101 and is connected to linkage 102 by a coupling 106.

It will be apparent that at those places where the actual welding line is in exact conformity with the design contour built into the cam track 62, there will be no relative vertical movement between the sleeve 88 and the rod 105. The sleeve 88 will be positioned vertically by the cam track contour through the action of roller 94, and the probe head 80 will be positioned vertically through actual engagement of its contact 84 with the seam of the workpiece. However, any vertical variation in the actual welding line from the design pattern will result in a relative vertical movement of the sleeve and rod 105. This plus or minus information is transferred to the memory unit 103 by the linkage 102.

The probe unit 78, while it can move vertically independently of the shoe or support 60, is guided horizontally along with the shoe by the cam tracks 44 and 46. Hence the probe head 80 will move horizontally in exact conformity with the horizontal variations in the design pattern built in the cam tracks 44 and 46. However, the probe contact 84 can move horizontally relative to the probe head and therefore can follow the actual contour of the seam to be welded. Relative movement between the probe slide 82 and the probe head occurs when the contact 84 senses an error or deviation in the actual welding line from the design pattern.

The probe slide 82 is hollow and has a pin 110 extending across the interior. A push-pull cable 112 extends through a block 114 secured to the probe head, and into the probe slide. A stop 116 on the end of the cable is secured to pin 110. A coil spring 118 is compressed between block 114 and the stop 116, urging the probe slide 82 to the left in FIGURE 19 to maintain the probe contact in engagement with the seam being welded. The cable 112 is longitudinally slidable in a tube 120 which is secured to the block 114 on the probe head within a hose 122. If there is any deviation in the actual welding line from the design pattern, the probe slide 82 will move relative to the probe head 80, and there will be a corresponding relative movement between the cable 112 which moves with the probe slide, and the tube 120 which moves with the probe head. The cable 112 and tube 120 are linked to the memory unit where the plus or minus information is received.

In view of the fact that the probe unit leads the welding torch by several inches (as indicated in FIG. 5 by the distance between roller followers 64 and 94), it is necessary for the error, if any, registered by the probe unit to be stored temporarily in the memory unit 103 before it is transmitted to the torch. The memory unit, FIGS. 1, 2, 9 and 10, is mounted on the support or shoe 60 by a plate 121. A fixed spindle 122 is secured to the plate 121, and bearings 123 support a drum 124 for free rotation on the spindle. A second fixed spindle 125 is mounted on plate 121 in laterally spaced parallel relation to the first spindle, and a second drum 126 is mounted by bearings 127 for free rotation on the spindle 125.

These drums 124 and 126 are alike in that they are cylindrical and have around their entire circumference a multiplicity of closely spaced axially extending grooves 127. The grooves extend from end to end of the drums and are of uniform semi-cylindrical cross-section throughout their length. There is an elongated cylindrical gauge pin 128 in each one of the grooves in both drums. The gauge pins 128 are the same diameter as the I.D. of the half-circular grooves 127. The gauge pins 128 in each drum are of equal length and are positioned axially in accordance with slight errors or departures in the actual weld line from the design pattern, and this information is stored in the memory unit and then transmitted back to the torch to correct for the error.

The drums of the memory unit are rotated by the same motor 20 which drives the carriage 10. The drive shaft 26 of the carriage has a spur gear 128 supported within the lower casting 14 of the carriage, in mesh with a spur gear 129 supported for rotation within casting 14. A vertically extending square shaft 130 is journaled at its lower end for rotatiton in casting 14 and also carries a spur gear 131 in mesh with gear 129. Hence the rotation of the carriage drive shaft 26 is transmitted to the shaft 130 of the memory unit by the gearing described. The upper end of the square shaft 130 fits into a complementary, square shaped hole 132 in a cover 133 which is secured to the drum 124. In this manner the drum 124 is rotated continuously as the carriage 10 is moved along its path, in the direction of the arrows.

In order to rotate the second memory drum 126, an endless belt 134 is provided. The belt 134 extends around the outer sides of the two drums in friction engagement with the gauge pins 128 therein, so that the rotation of the first drum 124 is transmitted to the second drum.

Figure 9:
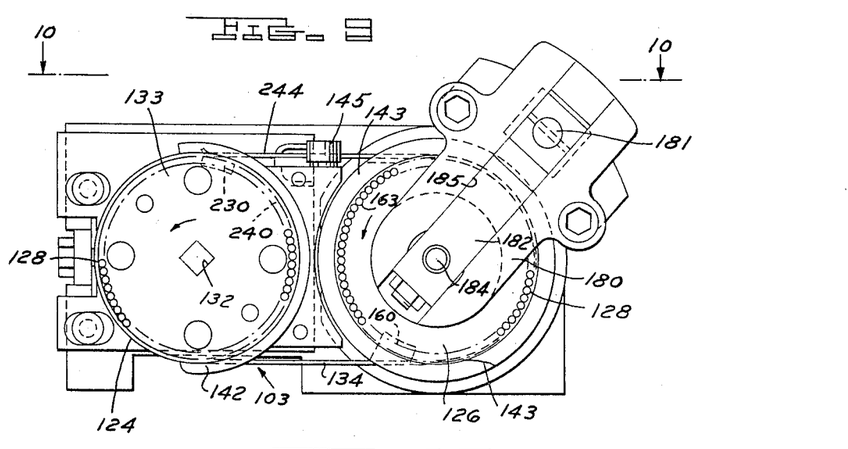
FIGURE 9 is a view taken on the line 9—9 of FIGURE 2.

The belt 134 not only transmits the rotation of one drum to the other, it also serves as a means for retaining the gauge pins 128 in their grooves throughout half their rotation. As seen in FIGURE 9, the belt is straight between the drums and is tangent to each drum at two points 180° apart. Between the points of tangency the belt engages the pins and holds them in the grooves under pressure so that they cannot shift up or down. In order to hold the gauge pins in their grooves throughout the remaining half of their rotation, a gauge pin guard 140 is provided between the drums. The gauge pin guard 140 has a part 142 which extends around the inner portion of the drum 124, and a part 143 which extends around the inner portion of drum 126. These parts 142 and 143 are arcuate and more than 180° in extent. They are spaced slightly from the drums so as to confine but not to interfere with the vertical movement of the gauge pins nor prevent them from moving up or down in the grooves. The guard parts 142 and 143 are cut away at the middle, as indicated at 144, to clear the belt. Rollers 145 on the guard guide the belt 134.

Figures 3, 16, 17, 18, 19, 20:
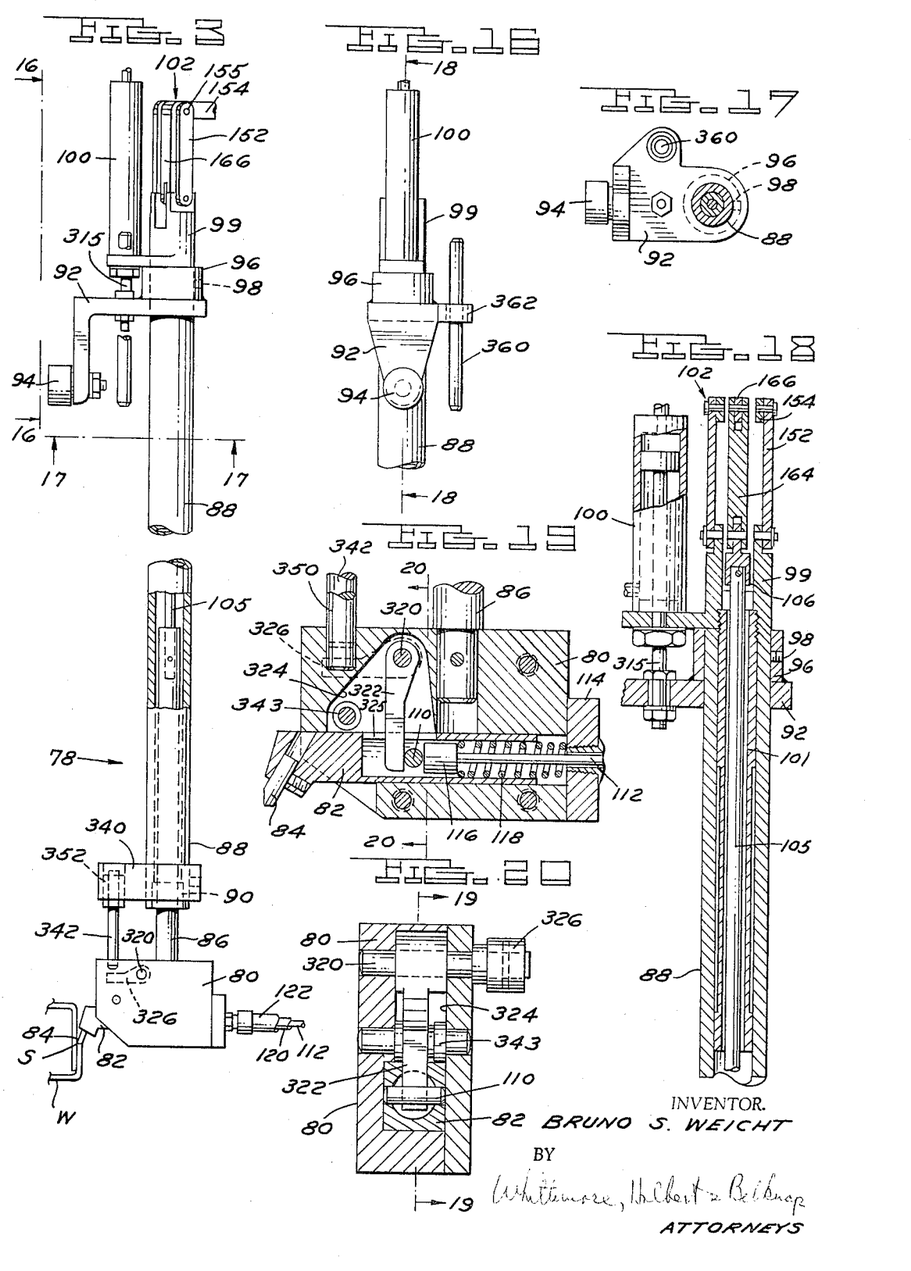
FIGURE 3 is an elevational view, with parts broken away and in section, of the probe unit.
FIGURE 16 is a view taken on the line 16—16 of FIGURE 3.
FIGURE 17 is a view partly in section, taken on the line 17—17 of FIGURE 3.
FIGURE 18 is a sectional view taken on the line 18—18 of FIGURE 16.
FIGURE 19 is a sectional view of the probe head taken on the line 19—19 of FIGURE 20.
FIGURE 20 is a sectional view taken on the line 20—20 of FIGURE 19.
Figure 3:
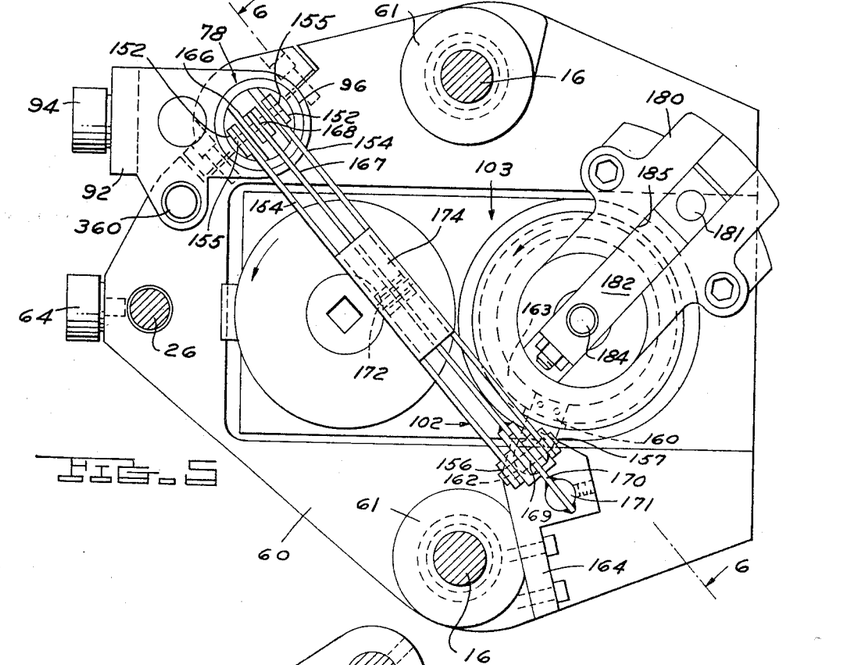
Figure 6:
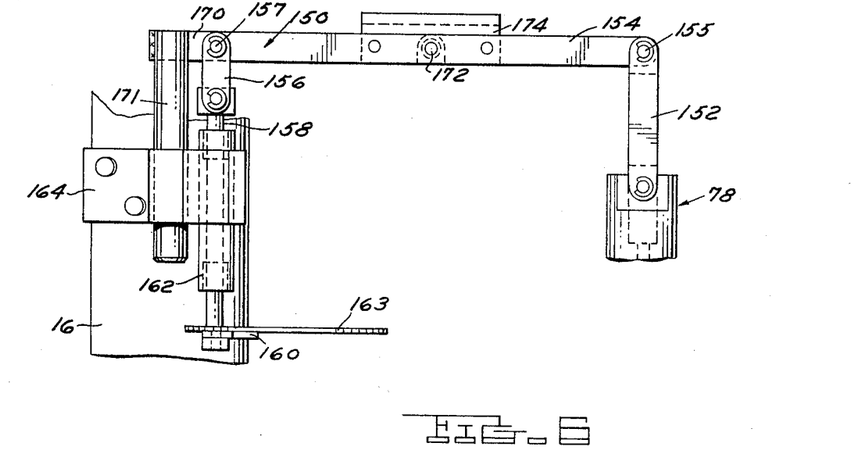
FIGURE 6 is a view taken on the line 6—6 of FIGURE 5.

As pointed out above, the probe head 80 will cause the shaft 86 to move relative to its supporting sleeve 88, whenever there is a vertical discrepancy between the actual weld line and the design weld contour. Such a discrepancy or error will be fed into the memory drum 126 through the linkage 102, which will now be described. Referring to FIGURES 3, 5 and 6, the swivel head, which moves up and down with the sleeve 88 in operation, has pivoted to its upper end, a pair of parallel links 152. At their opposite ends, the links 152 are respectively pivoted to the bars 154 at 155. The bars 154 are pivoted at 157 at their opposite ends to the links 156 which in turn are pivoted to a vertical rod 158 carrying a lifter 160 at its lower end. The rod 158 is supported for free sliding movement within a tube 162 carried by a fixed block 164. The lifter 160 is arranged to extend underneath the pins carried by the memory drum 126 so that as the pins pass over the lifter, they are elevated in accordance with the level of the lifter. A flexible leaf spring 163 is connected to the lifter and serves as a cam track to guide the pins up to the level of the lifter. The leaf spring is arcuate and, with reference to FIGURES 5 and 9, extends from the point of tangency of belt 134 with drum 126 at the top of the figures, counterclockwise to the lifter. Hence when the pins leave the belt, they drop to the leaf spring cam 163 and then are raised to the elevation of the lifter.

The coupling 165 which is connected to the probe head 80 by rods and 105, is pivoted to a link 166, and the opposite end of the link is pivoted to a bar 167 at 168. The opposite end of the bar 167 is pivoted at 169 to the end of a fixed bracket 170. The pivots 155 and 168 are aligned, and pivots 157 and 169 are aligned. The fixed bracket 170 is supported on the block 164 by a rod 171. The bars 154 and 167 extend parallel to one another, and of equal length between their aligned end pivots, and are pivoted together midway between their ends by a pin 172 which is carried by the bridge 174.

The linkage arrangement is such that if the rod 86 (which moves with the probe head 80) and the swivel head 99 (which moves with sleeve 88) move vertically together, there will be no change in the position of the lifter 160. The bars 154 and 167 will merely pivot up and down about the aligned pivots 157 and 169. However, any relative movement between the rod 86 and swivel head 99 will be transmitted to the lifter and will alter the elevation of the lifter. For example, if the rod 86 should move upward with respect to the swivel head 99, bar 167 will swing counterclockwise in FIGURE 6 about its pivot 169. The pivot 172 will accordingly be elevated one-half the distance rod 86 is raised, elevating the midpoint of bars 154. Bars 154 will pivot clockwise about their pivots 155, so that their opposite ends 157 will rise the same distance as rod 86. This will cause the lifter 160 to rise the same distance as rod 86. A relative downward movement of the rod 86 will cause the lifter likewise to descend an equal distance.

The pins of the memory drum 126 are positioned by the lifter 160 just prior to the point where they become frictionally engaged in their outer orbit by the belt 134. The belt engages the pins with substantial pressure and will hold them in their grooves by friction at the proper level until they reach a takeoff point on the memory drum which is spaced from the lifter far enough to account for the lead distance of the probe over the torch as they move along the work.

Figure 10:
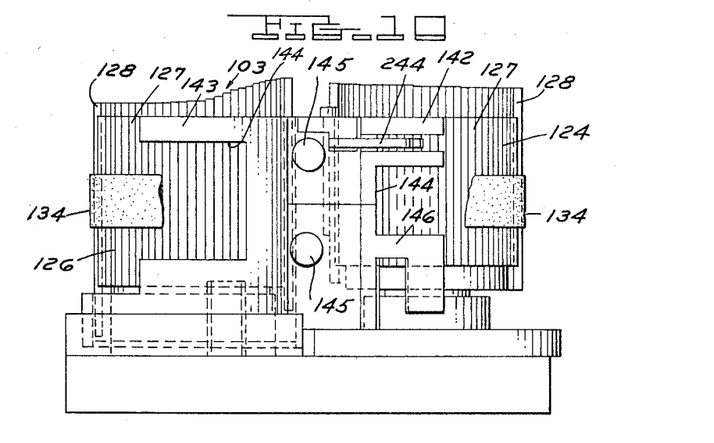
FIGURE 10 is a view taken on the line 10—10 of FIGURE 9.

The mechanism for taking the information off the gauge pins of the drum 126 and transmitting it to the welding torch is shown in FIGURES 2, 5 and 10. This takeoff mechanism includes a support 180 carrying an arm 182. The support 180 is fixed to a vertically extending spindle 181, which in turn is fixed to a member 183 on plate 121. This arm is guided for vertical movement in a channel 185 of the support, and is connected to the upper end of a vertically extending rod 184 which passes through the fixed spindle 125 of the memory unit. This arm also has a roller follower 186 which rides on the upper ends of the gauge pins of memory drum 126 in the portion of their orbit where they are held by the belt 134. The rod 184 is connected to the torch shaft 58 so that as the roller 186 follows the upper ends of the pins, the torch is moved up and down. The rod 184 is connected to the torch rod 58 by a connecting rod 188. Connecting rod 188 is pivoted to the rod 184 at one end, and at the other end is pivoted to a guide block 190. The guide block is fixedly secured to the torch rod 58. The guide block 190 has an extension 192 which engages an elongated vertical slot 194 in a cover 196 on the torch sleeve 70 to prevent any rotation of the torch shaft as it moves up and down.

Since the roller 186 supports the torch and connecting linkage on the gauge pins, means are provided, in addition to belt 134, for preventing the gauge pins from slipping in their grooves under the weight. For this purpose, a roller 198 is rotatably mounted on the spindle 181 and has rubber tires 200. The tires 200 frictionally engage the pins of the memory drum 126 at exactly the point where the roller 186 rests upon them, to prevent the gauge pins from shifting vertically.

Figure 11:
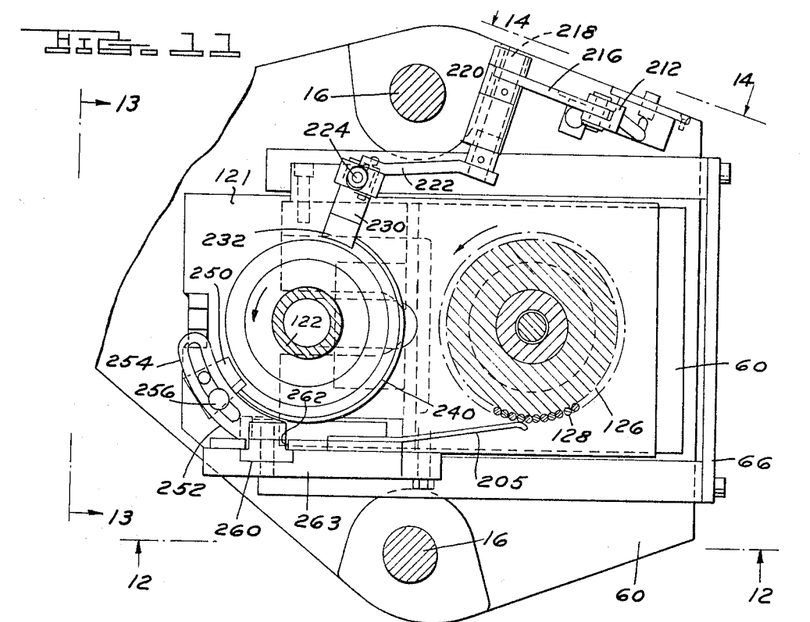
FIGURE 11 is a view partly in section, taken on the line 11—11 of FIGURE 2.

Referring to FIGURES 9, 11 and 12, at approximately the point where the lifter 160 engages the lower ends of the gauge pins to adjust their vertical position, the free ends of a pair of leaf springs 205 lightly engage the gauge pins to retain them in the adjusted position. At this point, the gauge pins have not yet entered the portion of their orbit where they are confined and held firmly by the belt 134. Before the gauge pins leave the free ends of the leaf springs 205 however, they are engaged and held by the belt so that they will retain their adjusted position.

As stated above, the lateral movements of the carriage 10, and hence of the probe head 80, are determined by the cam tracks 44 and 46. These cam tracks constrain the probe head 80 to follow the lateral or horizontal variations of contour in the design pattern of the welding line. Where there is no departure of the actual welding line from the design pattern, there will be no relative movement between the probe slide 82, which carries the probe contact 84, and the probe head 80. Hence there will be no axial movement of the cable 112 within the tube 120. However where there is an error in the actual welding line, this plus or minus information will cause the probe slide 82 to move within the probe head 80, and produce a resultant axial movement of the cable 112 within tube 120. This information is transmitted to the drum 124 of the memory unit.

Referring to FIGURES 11, 13 and 14, the tube 120 is secured to a swivel 210 on the shoe 60. The cable 112 extends beyond the tube 120 and has a coupling 212 on its end pivoted at 214 to an arm 216. The arm 216 is secured to a pin 218 which rotates in a block 220 fixed to the memory unit. An arm 222 is also fixed to the pivot pin 218. The opposite end of the arm 222 is pivoted to a rod 224 which has a ball 226 on its lower end slidably and pivotally supported in a block 228 mounted on the plate 221. The rod 224 carries a lifter 230 which has a magnet 232. The lifter is located so that its magnet 232 is disposed beneath the gauge pins of the memory drum 124 just before the pins enter the outer orbit where they are frictionally engaged by the driving belt 134. Before the pins reach the magnet 232, and during the time they are in their inner orbit free of the belt 134, their lower ends rest on a cam track 240. The cam track 240 is arcuate and extends from the point where the pins leave the belt at the bottom in FIGURE 9, terminating at the magnet 232 at a level above the maximum elevation of the magnet 232. Hence the gauge pins will ride up the track 240 and drop to the level of the magnet 232. Because of the holding character of a magnet, the pins will not bounce when they strike the magnet 232 but will retain the adjusted position determined by the magnet. Referring to FIGURES 9 and 10, the free ends of leaf spring 244 engage the gauge pins at the time they are in contact with the magnet 232. The leaf springs have a light pressure engagement with the gauge pins to hold them in the proper position determined by the magnet until they enter the outer orbit of the memory drum where they are engaged and frictionally held by the belt 134.

Referring to FIGURES 11, 12 and 13, take-off mechanism is provided for transmitting the plus or minus information registered by the location of the gauge pins of drum 124 to the torch. The take-off mechanism includes a follower 250 which, as seen in FIGURE 11, is spaced from the magnet 232 by a distance which takes into account the lead distance of the probe head over the torch. The follower 250 engages the lower ends of the gauge pins and is secured to a bracket 252. The bracket has a slotted arcuate arm 254, and fasteners 256 extend through the slot. The fasteners secure the follower 250 to the slotted arm in adjusted position. When the fasteners are loosened they may be moved along the slot so as to adjust the follower.

The bracket 252 is carried by a slide 260 which is capable of moving vertically in a guide 262. Guide 262 is formed in a wall 263 to which springs 205 are connected. The lower end of the slide 260 has a laterally extending pin 270 which engages a slot in the end of an arm 272 of a bell crank 274. The bell crank turns on a fixed pivot 276, and its other arm 278 has a slot which engages a pin 280 in the torch slide 68. The torch slide carries the tube 70 through which the torch shaft 58 extends, so that horizontal movement of the torch slide will move the torch transversely to the path of the carriage 10 along the seam of the work. Normally the torch slide 68 is urged to the left in FIGURES 2 and 12 by springs 284, to hold the follower 250 up against the lower ends of the gauge pins. Springs 284 are connected at one end to shoe 60 and at their opposite ends to the slide 68.

The torch may be retracted upwardly by an air cylinder 300 (FIG. 2) secured to the sleeve 70. When extended, the piston rod 302 of the air cylinder engages an abutment 304 on the guide block 190. As a result, the torch is raised.

The torch can be retracted laterally, or to the right in FIGURES 1 and 2, by an air cylinder 310 carried by the shoe 60. When extended, the rod 312 of the cylinder engages a flange of a bracket 314 on the torch slide to move the torch slide to the right.

Referring to FIGURES 3, 16 and 18, the probe head can be retracted in an upward direction, by the air cylinder 100. The rod 315 of this air cylinder is connected to the L-shaped bracket 92 so that when the rod is extended the swivel head 99 will be lifted from the sleeve 88. This action through the linkage 102 will lift the probe head 80.

Referring to FIGURES 3 and 19, when the probe head is lifted the probe slide 82 will automatically be retracted to the right. A pin 320 in the probe head has a depending finger 322 secured to it in a cavity 324 of the head, and the finger extends through a slot 325 in probe slide 82 and engages the pin 110. A laterally extending finger 326, outside the head, is also secured to pin 320 and normally extends horizontally. A block 340 secured to the lower end of sleeve 80 has a rod 342 secured to it which extends downward above the free end of the finger 326. Normally the rod 342 will be above the finger and out of contact with it so as not to retract the probe slide during a welding operation. However, when the probe head is retracted upwardly by the air cylinder 100, the finger 326 is contacted by the rod 342, turning the finger 322 counterclockwise and retracting the proble slide 82 to the right, away from the work. A roller 343 in the probe head 80 engages slide 82 to facilitate the sliding movement thereof.

A rod 350 secured at its lower end to the probe head slides in a bushing 352 in the block 340 to prevent the probe head from rotating. A rod 360 secured at its lower end to the shoe 60, slides in a bushing 362 in the L-shaped bracket 92 of the probe unit to prevent the probe unit from rotating.

In operation, the carriage 10 moves along the length of the workpiece W through the operation of the motor 20. The carriage is guided horizontally by the tracks 44 and 46 which simulate the horizontal pattern of the design welding line. The shoe 60 which carries the welding torch 56 is caused to follow this horizontal design pattern. The vertical pattern of the design welding line is built into the cam track 62, and the shoe 60 likewise follows this vertical pattern through the operation of its roller 64. The roller 64 engages the portion of track 62 which corresponds to the portion of the actual welding line operated on by the torch. Likewise the roller 94 for the probe unit engages the portion of track 62 which corresponds to the portion of the actual welding line contacted by probe contact 84.

The probe unit leads the torch along the length of the workpiece. When the probe contact 84 senses a vertical error in the actual welding line which extends lengthwise of the workpiece, it will cause the rods 86 and 105 carried by the probe head 80 to move axially within the sleeve 88. This relative movement is transmitted through the linkage 102 to the memory drum 126. The gauge pins of memory drum 126 are positioned according to the information received by it, which information is then taken from the pins by follower 186 and then transmitted to the torch shaft 58, either raising or lowering the welding rod slightly from the design pattern of the cam track 62 to correct the error.

When the probe contact 84 senses a horizontal error in the welding line, the probe slide 82 will move inside head 80, producing a corresponding relative movement of cable 112 within tube 120. This plus or minus information is transmitted to the memory drum 124 through the rocker linkage shown in FIGURE 14. The plus or minus information is then taken from the pins of the drum 124 by the follower 250 and transmitted to the torch slide 68. Accordingly, the torch will be shifted horizontally from the design pattern built into the cam tracks 44 and 46, in accordance with the error detected by the probe.

At the end of the welding operation, the cylinder 100 is operated to retract the probe head 80 in an upward direction, automatically retracting the probe slide 82 horizontally by finger 322. Also at the end of the welding operation, the cylinders 300 and 310 may be operated to retract the torch upwardly and to the right.

What I claim as my invention is:

1. In a welding tracer, means for guiding a welding torch along a predetermined path corresponding to the design pattern of the welding line in a workpiece, means for correcting the position of the torch in accordance with the actual welding line of the workpiece including a probe unit having a support, means for guiding said support along said predetermined path, a probe head, means mounting said head on said support for movement in opposite directions, a probe slide, said head having a guide supporting said probe slide for movement in a direction transverse to the movement of said head, a contact on said slide engageable with the actual line on the workpiece to be welded, means operated in response to relative movement between said probe head and support for adjusting said torch in the direction of such relative movement, and means operated in response to relative movement between said probe slide and head for adjusting said torch in said transverse direction.

2. In a welding tracer, means for guiding a welding torch along a predetermined path corresponding to the design pattern of the welding line in a workpiece, means for correcting the position of the torch in accordance with the actual welding line of the workpiece including a probe unit having a support, means for guiding said support along said predetermined path, a probe head, means mounting said head on said support for vertical movement, a probe slide, said head having a guide supporting said probe slide for horizontal movement, a contact on said slide engageable with the actual line on the workpiece to be welded, means operated in response to relative vertical movement between said probe head and said support for adjusting said torch vertically, and means operated in response to relative horizontal movement between said probe slide and head for adjusting said torch horizontally.

3. The structure defined in claim 2, wherein said support includes a vertical sleeve, and the means mounting said head on said support includes an elongated vertical member longitudinally movable within said sleeve.

4. In a welding tracer, a carriage, means for moving said carriage along a predetermined path and for guiding the same laterally in accordance with the lateral variations in the design pattern of the welding line in a workpiece, a support carried by said carriage for movement vertically relative thereto, means for adjusting the vertical position of said support relative to said carriage in accordance with the vertical variations in the design pattern of the welding line in the workpiece as said carriage moves along its path, a torch slide mounted on said support for lateral movement, a torch mounted on said torch slide for vertical movement, a probe unit having means for tracing the actual welding line in the workpiece and for sensing both lateral and vertical departures in the contour of the actual welding line from the design pattern, means for moving said torch slide laterally in response to the sensing of lateral departures in the actual welding line, and means for moving said torch vertically relative to said torch slide in response to the sensing of vertical departures in the actual welding line.

5. The structure defined in claim 4, wherein resilient means are provided urging said torch slide in one direction.

6. The structure defined in claim 5, wherein power means are provided for moving said torch slide in the opposite direction to a retracted position, and power means are provided for elevating said torch to a retracted position.

7. In a welding tracer, means for guiding a welding torch along a predetermined path corresponding to the design pattern of the welding line in a workpiece, means for correcting the position of the torch in accordance with the actual welding line in the workpiece including a probe unit having means for tracing the actual welding line in the workpiece in advance of the torch and for sensing departures in the actual welding line from the design pattern, a memory unit including a cylindrical drum having a multiplicity of circumferentially spaced longitudinally extending grooves in its periphery extending from end to end of said drum, an elongated pin in each groove longitudinally slidable relative thereto, a driving belt for rotating said drum and extending about a portion only of said drum in friction contact with said pins to hold them in longitudinally adjusted position, means operated by said probe unit for adjusting the pins in the remaining portion of said drum longitudinally according to departures sensed by said probe unit in the actual welding line from the design pattern, and means for shifting the torch in accordance with the adjustment of said pins held by the belt.

8. The structure defined in claim 7, wherein a carriage is provided for the torch, probe unit and memory unit, and drive means are provided for said carriage to move the latter along said predetermined path, said drive means also operating to rotate said drum.

9. The structure defined in claim 7, wherein the adjusting means for the pins comprises a vertically adjustable magnet beneath the pins, and an arcuate ramp extending under the path of said pins and terminating at said magnet above the latter so that the pins drop off said ramp onto said magnet and are held from bouncing by the magnetic character of the latter.

10. The structure defined in claim 7, wherein said adjusting means for the pins comprises a vertically adjustable lifter beneath said pins, and an arcuate track extending under the path of said pins and secured at its end to said lifter, said track being flexible so that its end can move up and down with said lifter and providing a gradual ramp to the elevation of said lifter.

11. The structure defined in claim 7, wherein the means for shifting the torch includes a follower resting against the ends of said pins, and friction roller means engage said pins at the point where they are contacted by said follower to prevent movement of said pins by the pressure of said follower.

12. In a welding tracer, means for guiding a welding torch along a predetermined path corresponding to the design pattern of the welding line in a workpiece, means for correcting the position of the torch in accordance with the actual welding line in the workpiece including a probe unit having means for tracing the actual welding line in the workpiece in advance of the torch and for sensing both vertical and lateral departures in the contour of the actual melding line from the design pattern, a memory unit including first and second spaced, parallel, cylindrical axially rotatable drums, each drum having a multiplicity of circumferentially spaced longitudinally extending grooves in its periphery extending from end to end thereof, an elongated pin in each groove longitudinally slidable relative thereto, means for rotating said first drum, a belt extending about said drums in friction contact with the pins in the outer 180° of the peripheries of said drums to hold said pins in longitudinally adjusted position and to rotate said second drum, means operated by said probe unit for longitudinally adjusting the pins of one drum not held by said belt according to lateral departures sensed by the probe unit in the actual welding line from the design pattern, means operated by said probe unit for longitudinally adjusting the pins in the other drum not held by the belt according to vertical departures sensed by the probe unit in the actual welding line from the design pattern, means for shifting the torch laterally in accordance with the adjustment of pins held by the belt in said one drum, and means for shifting the torch vertically in accordance with the adjustment of the pins held by the belt in said other drum.

13. The structure defined in claim 12, wherein a carriage is provided for the torch, probe unit and memory unit, and drive means are provided for said carriage to move the latter along said predetermined path, said drive means also operating to positively rotate said first drum.

14. The structure defined in claim 12, wherein said pins are vertical, one of the means for shifting said torch includes a follower resting under pressure upon the upper ends of said pins of one of said drums, and friction roller means engage said last mentioned pins at the point where they are contacted by said follower to prevent movement of said last mentioned pins by the pressure of said follower.

15. In a welding tracer, means for guiding a welding torch along a predetermined path corresponding to the design pattern of the welding line in a workpiece, means for correcting the position of the torch in accordance with the actual welding line of the workpiece including a probe unit having a support, means for guiding said support along said predetermined path in advance of said torch, said probe unit having a contact movable in opposite directions relative to said support and engageable with the actual line on the workpiece to be welded, a memory unit having information receiving members adjustable parallel to the movement of said contact relative to said support, means for adjusting said members in the same direction as the movement of said contact relative to said support including a first elongated bar, a first pivot on one end of said bar having an operative connection with said contact so as to move in said opposite directions therewith, a fixed second pivot on the other end of said bar, a second elongated bar having a third pivot on one end aligned with said first pivot and operatively connected to said support, a movable adjuster engageable with said members to adjust the latter, a fourth pivot on the opposite end of said second bar aligned with said second pivot and operatively connected to said adjuster, means pivotally connecting said bars intermediate their ends, and means for shifting said torch in accordance with the adjustment of said members.

16. In a welding tracer, means for guiding a welding torch along a predetermined path corresponding to the design pattern of the welding line in a workpiece, means for correcting the position of the torch in accordance with the actual welding line of the workpiece including a probe unit having a support, means for guiding said support along said predetermined path in advance of said torch, said probe unit having a contact movable vertically relative to said support and engageable with the actual line on the workpiece to be welded, a memory unit having information-receiving elongated vertically adjustable vertical pins, means for adjusting said pins vertically in the same direction and to the same extent as said contact moves relative to said support including a first elongated bar, a first pivot on one end of said bar having an operative connection with said contact so as to move vertically therewith, a second fixed pivot on the other end of said bar, a second elongated bar parallel to the first having a third pivot on one end aligned with said first pivot and operatively connected to said support, a movable adjuster engageable with said members to adjust the latter, a fourth pivot on the opposite end of said second bar aligned with said second pivot and operatively connected to said adjuster, means pivotally connecting said bars midway between their ends, and means for shifting said torch vertically in accordance with the adjustment of said members.

17. In a welding tracer, means for guiding a welding torch along a predetermined path corresponding to the design pattern of the welding line in a workpiece, probe means for tracing the actual welding line and for sensing departures in the actual welding line from the design pattern in a first direction and also in a second direction transverse to said first direction, and means for adjusting said torch in said first direction in response to the sensing of such departures in said first direction and also means for adjusting said torch in said second direction in response to the sensing of such departures in said second direction.

18. In a welding tracer, means for guiding a welding torch along a predetermined path corresponding to the design pattern of the welding line in a workpiece, a probe unit having means for tracing the actual welding line in the workpiece in advance of the torch and for sensing departures in the actual welding line from the design pattern, a memory unit including a cylindrical drum having a multiplicity of circumferentially spaced longitudinally adjustable pins, means for holding said pins about a portion only of said drum in longitudinally adjusted position, means operated by said probe unit for adjusting the pins in the remaining portion of said drum longitudinally according to departures sensed by said probe unit in the actual welding line from the design pattern, said adjusting means comprising a vertically adjustable magnet beneath the pins, and an arcuate ramp extending under the path of said pins and terminating at said magnet above the latter so that the pins will drop off said ramp onto said magnet and will be held from bouncing by the magnetic character of the latter, and means for shifting the torch in accordance with the adjustment of said pins held by said holding means.

19. In a welding tracer, means for guiding a welding torch along a predetermined path corresponding to the design pattern of the welding line in a workpiece, a probe unit having means for tracing the actual welding line in the workpiece in advance of the torch and for sensing departures in the actual welding line from the design pattern, a memory unit including a cylindrical drum having a multiplicity of circumferentially spaced longitudinally adjustable pins, means for holding said pins about a portion only of said drum in longitudinally adjusted position, means operated by said probe unit for adjusting the pins in the remaining portion of said drum longitudinally according to departures sensed by said probe unit in the actual welding line from the design pattern, said adjusting means comprising a vertically adjustable lifter beneath said pins, and an arcuate track extending under the path of said pins and secured at its end to said lifter, said track being flexible so that its end can move up and down with said lifter and providing a gradual ramp to the elevation of said lifter, and means for shifting the torch in accordance with the adjustment of said pins held by said holding means.

20. In a welding tracer, means for guiding a welding torch along a predetermined path corresponding to the design pattern of the welding line in a workpiece, means for correcting the position of the torch in accordance with the actual welding line in the workpiece including a probe unit having means for tracing the actual welding line in the workpiece in advance of the torch and for sensing both vertical and lateral departures in the contour of the actual welding line from the design pattern, a memory unit including first and second cylindrical axially rotatable drums, each drum having a multiplicity of circumferentially spaced longitudinally adjustable pins, means for rotating said drums, means for holding said pins in a portion of each drum in longitudinally adjusted position, means operated by said probe unit for longitudinally adjusting the pins of one drum in the remaining portion thereof according to lateral departures sensed by the probe unit in the actual welding line from the design pattern, means operated by said probe unit for longitudinally adjusting the pins of the other drum in the remaining portion thereof according to vertical departures sensed by the probe unit in the actual welding line from the design pattern, means for shifting the torch laterally in accordance with the aforesaid adjustment of pins in said one drum, and means for shifting the torch vertically in accordance with the aforesaid adjustment of the pins in said other drum.

21. In a welding tracer, means for guiding a welding torch along a predetermined path corresponding to the design pattern of the welding line in a workpiece, a probe for tracing the actual line to be welded, said probe comprising a head means supporting said head for movement in one direction, a probe contact engageable with the actual line to be welded, means mounting said contact on said head for movement transversely of the movement of said head, means for correcting the position of the torch in accordance with the actual weld line in the workpiece comprising means for correcting the position of said torch in a first direction in accordance with the movement of said head relative to said supporting means, and means for correcting the position of said torch in a direction transverse to said first direction in accordance with the movement of said contact relative to said head.

22. In a welding tracer, means for guiding a welding torch along a predetermined path corresponding to the design pattern of the welding line in a workpiece, a probe for tracing the actual line to be welded, said probe comprising a head, means supporting said head for vertical movement, a probe slide, a contact on said probe slide engageable with the actual line to be welded, guide means on said head supporting said slide for horizontal movement, resilient means urging said slide horizontally, means for correcting the position of the torch in accordance with the actual weld line in the workpiece comprising means for correcting the position of said torch vertically in accordance with the vertical movement of said head relative to said supporting means, and means for correcting the position of said torch horizontally in accordance with the horizontal movement of said slide relative to said head.

23. In a welding tracer, a probe for tracing the actual line to be welded, said probe comprising a head, means supporting said head for vertical movement, a probe slide, a contact on said probe slide engageable with the actual line to be welded, guide means on said head supporting said slide for horizontal movement, resilient means urging said slide horizontally in one direction, means for moving said head in an upward direction to a retracted position, and means responsive to the movement of said head to retracted position for moving said slide horizontally to a retracted position.

References Cited by the Examiner
UNITED STATES PATENTS

| | | | |
|---|---|---|---|
| 2,383,266 | 8/1945 | Tourneau | 82—14 |
| 2,827,547 | 3/1958 | Tiedemann | 219—125 |
| 3,158,121 | 11/1964 | Brems | 228—7 |

JOHN F. CAMPBELL, *Primary Examiner.*

WHITMORE A. WILTZ, *Examiner.*

M. L. FAIGUS, *Assistant Examiner.*